United States Patent Office 3,455,156
Patented July 15, 1969

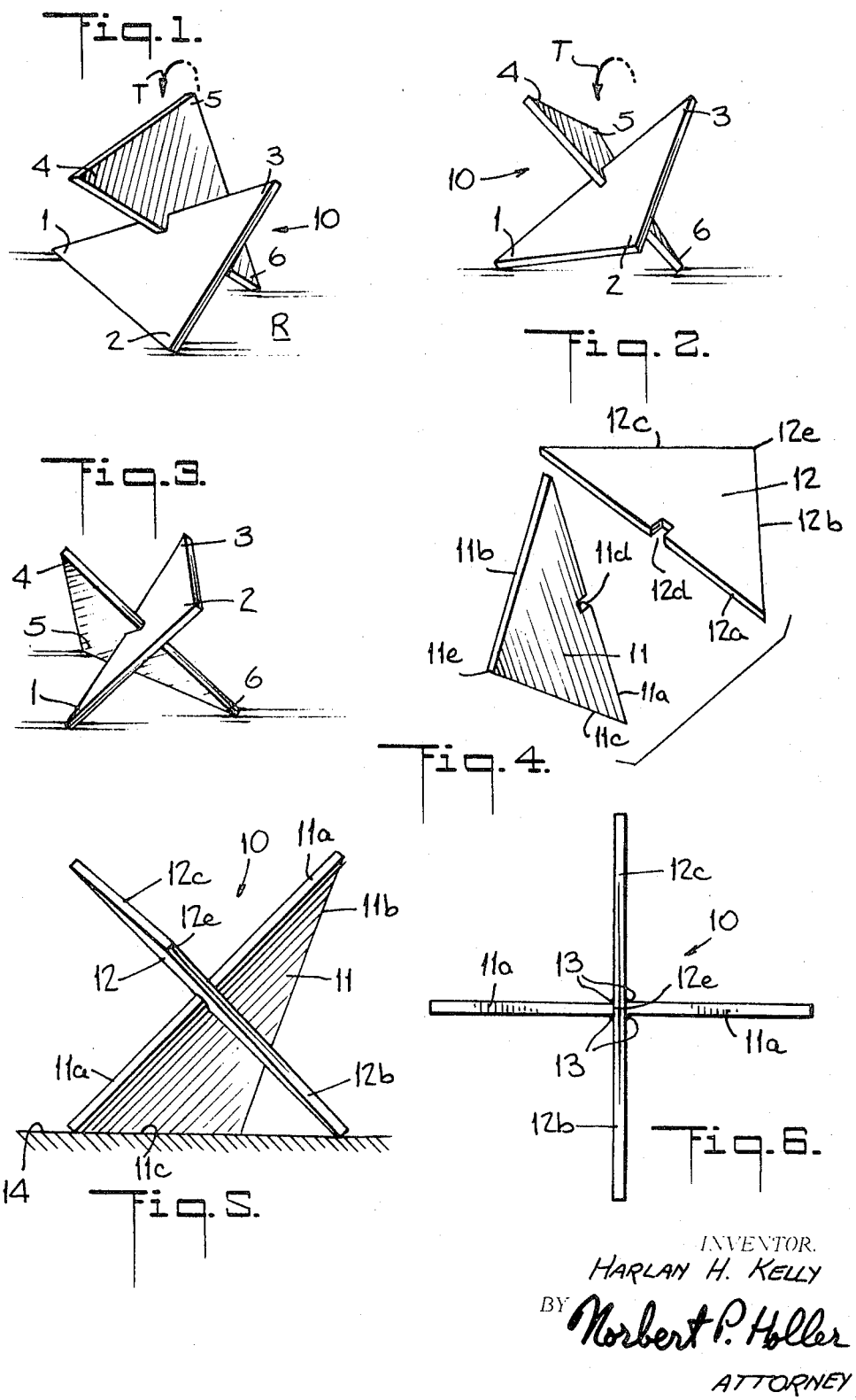

3,455,156
ROAD DEBRIS-SIMULATING DEVICES FOR TESTING TIRES
Harlan H. Kelly, Laredo, Tex., assignor to Uniroyal, Inc., New York, N.Y., a corporation of New Jersey
Filed Sept. 18, 1967, Ser. No. 668,365
Int. Cl. B60c *19/10;* G01m *17/02*
U.S. Cl. 73—146                                7 Claims

ABSTRACT OF THE DISCLOSURE

A multi-pointed and multi-edged road debris-simulating device designed to be placed on a test road surface for engagement by the tires of moving vehicles, the device being constructed of two rigid triangular plates arranged in respective perpendicular planes and fixedly secured to one another at one edge.

BACKGROUND OF THE INVENTION

This invention relates to the testing of automobile tires at tire proving grounds and in particular to multi-pointed and multi-edged devices adapted to be strewn across a test road surface for engagement by the tires of vehicles being driven over such surface.

Vehicle tires in ordinary use encounter and are subject to being damaged by a great many obstacles, such as rocks, nails, glass, etc. Of these types of highway debris, the ones which are acknowledged by tire experts to have the most deleterious effects are objects which tend not only to penetrate the tires but also to exert a cutting action on them, i.e. jagged pieces of glass or other sharp-edged and pointed articles. To facilitate improvements in the making of tires which will enable them more readily to resist such penetration and cutting damage, therefore, the tire industry has for many years been intensively engaged in developing a variety of testing procedures, the aim of some of which has been specifically to simulate the action of such cutting and penetrating road debris, especially glass which is by far the most frequently encountered type. In representative known variants of these procedures, accordingly, either odd-shaped pieces of glass are loosely spread over the road surface or various objects with cutting edges are fixed to the road surface, e.g. by being bolted down or embedded in the road surfacing material or secured to the latter with the aid of a binder.

These procedures, however, have not been entirely satisfactory or able to yield universally meaningful and acceptable results. Thus, where the test utilizes pieces of glass which are laid down loosely, a duplication of the test from one run to the next is for all practical purposes impossible. Where the fixed objects are used, on the other hand, the test, although it is reproducible, is unrealistic for a number of reasons. First, the highway debris which the fixed cutting edges are supposed to simulate usually is not fixed to the road surface, and thus its cutting action is of the rubbing or dynamic slicing type which is much more destructive than the deflection or static penetration type of cutting action of the fixed edges. Moreover, if the fixed object is an upwardly pointing nail or a spike, then its action is purely one of penetration unaccompanied by cutting. Second, loose debris may frequently be thrown more or less violently toward and against the rear wheels when the latter passed over it, and this "projectile" action of the debris on the rear wheels is obviously not capable of being performed by a fixed object.

SUMMARY OF THE INVENTION

It is an object of the present invention, therefore, to provide a novel class of loose highway debris-simulating devices which, when contacted by a rolling tire, will provide both a penetrating action and a dynamic rubbing or slicing type of cutting action on the tire.

Another object of the present invention is the provision of such devices which are effective to permit the performance of accurately duplicatable tests for the resistance of tires to penetration and cutting by sharp road debris and to yield meaningful and significant results in the evaluation of tire penetration and cutting resistance characteristics.

Briefly stated, the objectives of the present invention are attained by the use of multi-pointed and multi-edged devices each constructed of two identical, rigid, triangular plates which are arranged in respective perpendicular planes and are fixedly secured to one another, as by welding or the like, at their respective intersecting edges. Preferably, each such plate has the shape of an isosceles right triangle and is provided in its longest edge with a slot-like recess which extends perpendicularly to the said longest edge and advantageously is as wide and as deep as the thickness of the plate, so that the two plates can be interfitted at the slots to strengthen the joint therebetween.

The preferred arrangement ensures that the complete device normally rests on one of the shorter edges of one plate and one of the acute or non-right angle corners of the other plate, with neither plate being either in a vertical plane or in a horizontal plane relative to the ground surface, and that the height of each complete device is always the same regardless of which of its paired corners and edges it rests on. During the course of a test, then, any such device, upon being contacted by a rolling tire, say on the front wheel of a test vehicle, will in the first instance exert a static penetration action on the tire, but since by virtue of its angularity the device will also tend to be rotatably displaced by the tire as the same rolls over it, the first action will be followed by a rubbing or slicing type of cutting action on the tire. Moreover, as the tire completes its pass over the device, the latter may (depending, of course, on the speed of the vehicle) be flung more or less violently toward the rear wheel of the vehicle and under suitable conditions may be impacted against the rear tire before the latter passes over the device. The result is as thorough and duplicatable a simulation as possible of what vehicle tires undergo when encountering sharp pointed and edge objects such as pieces of glass on the road.

BRIEF DESCRIPTION OF THE DRAWING

The foregoing and other objects, characteristics and advantages of the present invention will be more clearly understood from the following detailed description thereof when read in conjunction with the accompanying drawing, in which:

FIGS. 1, 2 and 3 are perspective views of a debris-simulating device according to the present invention and illustrate the manner in which it functions when lying on a road surface and being encountered by a rolling vehicle tire;

FIG. 4 is an exploded perspective view of the device, showing the component plate parts thereof in pre-assembly relation;

FIG. 5 is an elevational view of the complete device in its normal or rest position; and FIG. 6 is a plan view of the device as seen when looking at the right angle apex of one of the component plates from a plane perpendicular to both plates.

PREFERRED EMBODIMENTS

Referring now first to FIGS. 4 to 6, it will be seen that the illustrated device 10 according to the present invention is composed of a pair of identical triangular plates 11 and 12 made of any suitably rigid metallic or non-metallic material, such as steel or aluminum sheet stock, acrylic acid resins, epoxy resins, etc. The plates are of right triangular, and preferably of isosceles right triangular, shape and have longer edges 11a and 12a (the hypotenuse of the triangle) and shorter edges 11b, 11c and 12b, 12c (the legs of the triangle). At their edges 11a and 12a the plates 11 and 12 are provided with respective central slot-like recesses 11d and 12d (FIG. 4) which are preferably as wide and as deep as the plate thickness and extend inwardly toward the respective right angle apices 11e and 12e (along the altitude of the isosceles triangle). The plates are disposed in respective perpendicular planes and are interfitted at their recesses 11d and 12d, i.e. with a small part of each plate confined in the recess of the other, as well as fixedly secured together, e.g. by being welded or otherwise bonded to each other as indicated at 13 (FIG. 6 only). The device 10 thus effectively has six corners and eight elongated edges in a variety of orientations, and by virtue of the thicknesses of the plates, each plate corner has two sharp points separated by a short cutting edge, and each plate edge has two long cutting edges. When the device is placed at rest on a supporting surface 14 (FIG. 5), the latter is engaged by one of the cutting edges of one of the shorter legs of one plate and by one of the sharp points of one of the non-right angle corners of the other plate, with both plates being in oblique planes, i.e. neither parallel nor perpendicular, to the supporting surface 14.

Referring now to FIGS. 1, 2 and 3, in use, the device 10 is placed (usually along with a number of other substantially identical devices) on the surfaces of a test road R (FIG. 1). For the purposes of and in order to facilitate the following description, the corners of the device will be identified by numerals 1 to 6. Thus, in the rest position of the device illustrated in FIG. 1, one of the points of each of the corners 1, 2 and 6 engages the ground, as does the entire cutting edge between the first two of these points.

Assuming now that a vehicle wheel tire approaches the device 10 from behind (FIG. 2), i.e. moving generally perpendicularly out of the plane of the paper or toward the reader, as indicated by the curved arrow T, the tire engages the most elevated point of the corner 5 first, so that the latter exerts a penetrating action on the tire. With the corner 5 offset from the imaginary line connecting the corners 1 and 6, however, the device will also start to pivot about that line, i.e. from the position illustrated in FIG. 1 to that illustrated in FIG. 2. Two further actions now result; one, one of the cutting edges of the first-engaged plate between the corners 5 and 4 thereof, by virtue of its movement, exerts a rubbing or slicing type of cutting action on the tire, and two, the upper rising point of the corner 3 of the other plate (FIG. 3) is brought around to exert a second penetratating action on the tire while at the same time the contiguous part of the cutting edge of this plate between the corner 3 and the plate juncture also exerts a second cutting or slicing action on the tire.

It is believed that the different actions of the device when contacted at other points or even edges can be readily visualized from these illustrations and need not be described in detail herein. Merely by way of example, if as in FIG. 1 a point of the corner 3 is engaged first in a penetrating action, the nearer cutting edge between the corners 4 and 5 will come around to exert the cutting action and a point of the corner 1 will come around to exert the second penetrating action. On the other hand, if as in FIG. 3 a cutting edge between the corners 2 and 3 is engaged first, a point of the corner 4 will come around to exert a penetrating action as the device pivots either about the edge between the points of the corners 5 and 6 (toward the upper right in FIG. 3) or about the imaginary line between the ground-engaging points of the corners 1 and 6 (toward the lower right in FIG. 3).

As previously mentioned, when a front tire has passed completely over such a device, the latter may be flung rearwardly, generally into the path of the following rear wheel of the vehicle and, if the speed of the vehicle is high enough, directly against the respective rear tire so as to exert a "projectile" action on the latter before the same passes over the device with the results previously described.

It will be readily apparent that in any given test run, all the devices 10 employed should preferably be the same in size, shape and height in all positions, so as to minimize the variables in the test. Nevertheless, the use of devices with known distributions of sizes and/or shapes and/or heights in any test group would be feasible, although complex statistical analyses may then be required to evaluate the results properly. It should also be noted that the testing of larger tires will generally entail the use of larger and stronger devices 10, and vice versa. Basically, however, the only requirements which must be met in each case are that the devices must be rigid (i.e. the plate thicknesses and the strengths of the joints must be sufficient to prevent bending or other distortion under load or impact), that the materials of which the devices are made must be durable and wear-resistant (in the case of metal, for example, the points and cutting edges might be case hardened), and that in each device when at rest the plates must be oblique to the ground or supporting surface. Within these fixed bounds, variations of parameters are, of course, possible. Thus, the depths of the notches 11d and 12d (which serve principally to enhance the solidity of the joint) may range up to as much as about ¼ of the altitudes of the triangles, although the lesser depths are preferred since they leave more of the cutting edges available for contact with the tires. Also, triangular shapes other than isoceles right triangles might be used, but in some such cases it will be more difficult to achieve the all-position height uniformity which is greatly to be desired.

By means of the test devices of the present invention, therefore, the effects of loose, sharp-pointed and sharp edged road debris can be simulated as faithfully as possible and with a high degree of reproduceability. Moreover, it will be understood that the desired combination of penetrating and cutting actions is and can be achieved only by implementation of the present invention and as the direct consequence of the characteristic arrangement, that in the rest position of the device neither of the component plate parts thereof is in either a vertical or a horizontal plane, i.e., either perpendicular or parallel to the road surface.

It is to be understood that the foregoing description of the road debris-simulating tire testing devices according to this invention is intended to be illustrative only, and that the structural and operational features and relationships disclosed may be varied and modified in a number of ways none of which entails a departure from the spirit and scope of the present invention.

Having thus described my invention, what I claim and desire to protect by Letters Patent is:

1. A road debris-simulating device for use in testing pneumatic vehicle tires for resistance to penetration and cutting, comprising a pair of rigid plates of triangular shape defining sharp corners and cutting edges, said plates being arranged in intersecting relation in perpendicular planes and rigidly secured to one another at their intersecting edges to define a unitary structure which has a multiplicity of sharp corners and cutting edges and which, when in a rest position on a supporting surface, has neither of its plates oriented either parallel or perpendicular to said surface.

2. A device according to claim 1, each of said plates being provided at said intersecting edge thereof with a short notch dimensioned to receive the corresponding edge of the other plate, thereby to solidify the joint therebetween.

3. A device according to claim 2, the width and depth of each of said notches being substantially equal to the the thickness of the other plate.

4. A device according to claim 1, said plates being of right triangular shape.

5. A device according to claim 1, said plates being of isosceles right triangular shape.

6. A device according to claim 5, said plates being secured to one another at the centers of their hypotenuses.

7. A device according to claim 1, said plates being arranged to impart a uniform height to the device in all rest positions thereof.

References Cited

UNITED STATES PATENTS 2,790,410  4/1957  Wald _____ 116—63

LOUIS R. PRINCE, Primary Examiner

D. O. WOODIEL, Assistant Examiner

U.S. Cl. X.R.

116—63